July 11, 1961
J. A. RHINE
2,991,760
TOOL FEED AND CONTROL
Filed Dec. 28, 1956
2 Sheets-Sheet 1
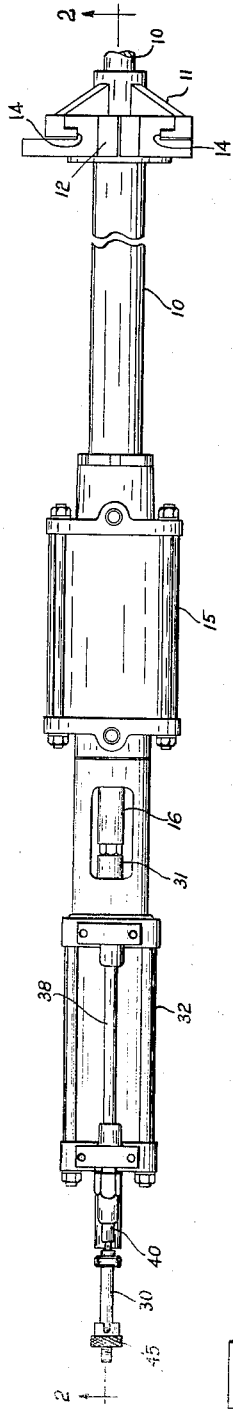
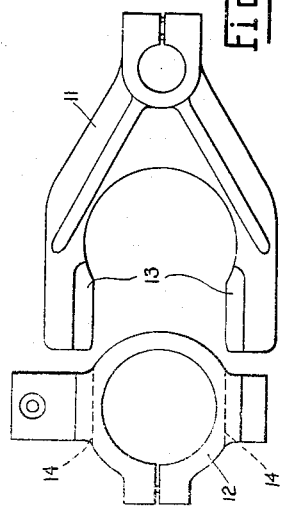
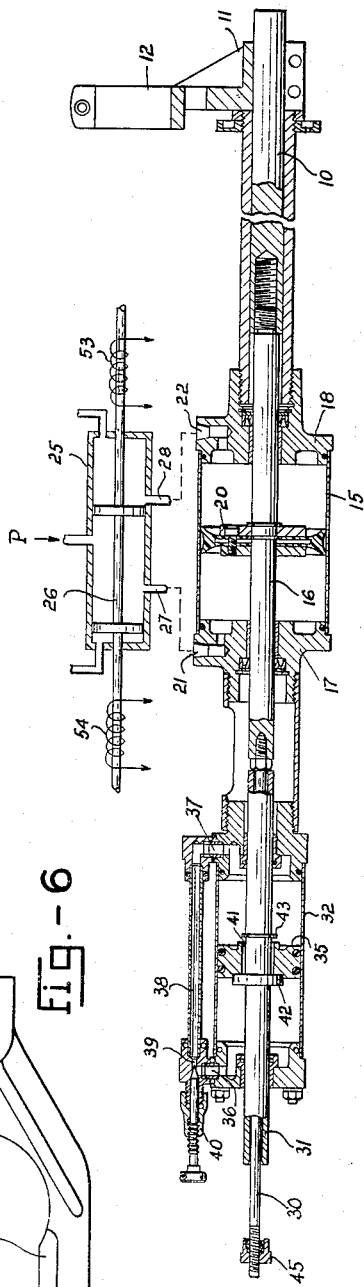
INVENTOR.
JULES A. RHINE
BY
Bates, Teare & McBean
ATTORNEYS July 11, 1961
J. A. RHINE
2,991,760
TOOL FEED AND CONTROL
Filed Dec. 28, 1956
2 Sheets-Sheet 2
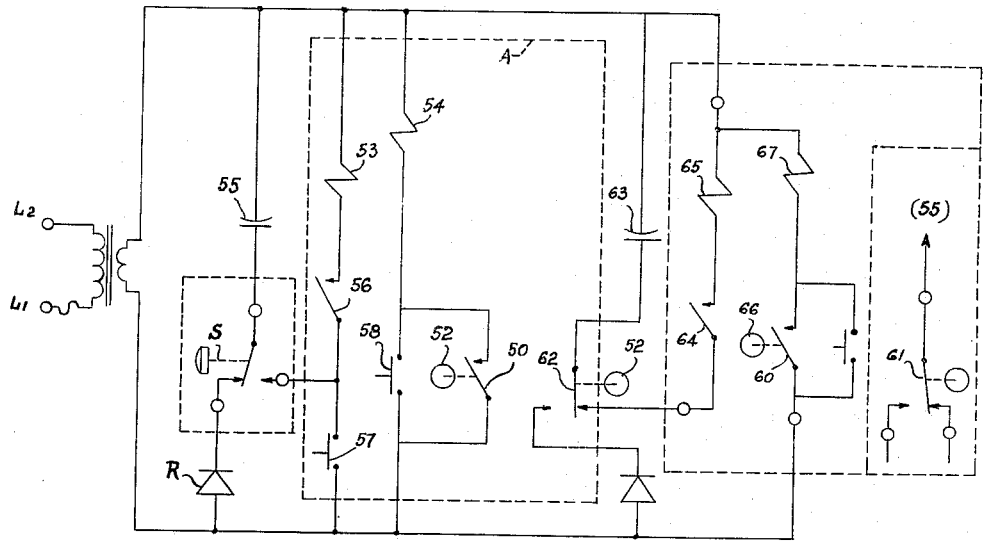
Fig.-5
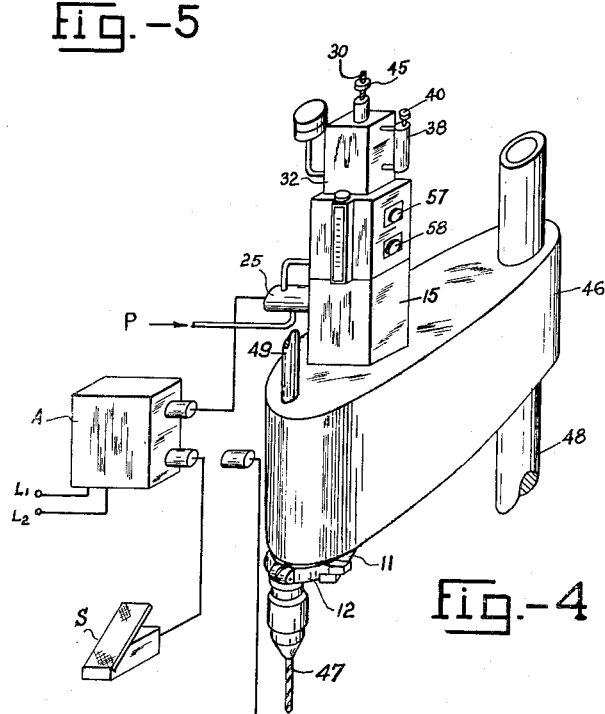
Fig.-4
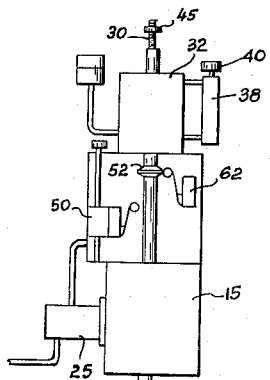
Fig.-3
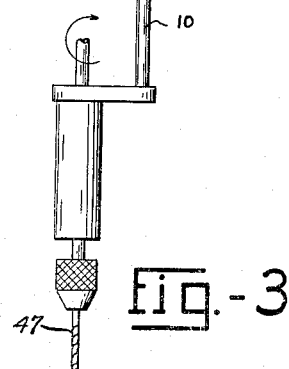
INVENTOR.
JULES A. RHINE
BY
Bates, Teare & McBean
ATTORNEYS

United States Patent Office 2,991,760
Patented July 11, 1961

2,991,760
TOOL FEED AND CONTROL
Jules A. Rhine, 10229 Akron-Cleveland Road,
Northfield, Ohio
Filed Dec. 28, 1956, Ser. No. 631,195
6 Claims. (Cl. 121—45)

This invention relates generally to a controlled feed mechanism for moving a tool towards and away from a work piece, and more particularly relates to a compact attachment that can be readily mounted on a standard drill press or the like to provide an adjustable and automatically controlled feed towards and away from a work piece alone or in synchronous sequential relation with a work piece positioning mechanism.

In many applications, it is desirable to control the rate of tool feed during performance of its work function on a work piece while otherwise permitting a rapid approach and return of the tool to and from the work piece. It is also desirable to apply driving power to the tool in such manner that it can be directly controlled to eliminate back lash and other undesirable effects during operation. A controlled feed mechanism of this type is further enhanced if it can be readily adapted for attachment on a standard tool support.

Accordingly, it is a principal object of this invention to provide a directly controlled feed mechanism in the form of a compact unit that can be readily mounted on a standard tool support without major alterations.

Another object of this invention relates to the provision of a directly controlled tool feed mechanism for providing a metered feed at the work piece with a rapid approach to and return from the work piece and yet which is simple and economical in construction and capable of highly sensitive adjustment and control.

A further object of the invention relates to the provision of a controlled tool feed mechanism which is automatically retracted upon attaining a predetermined extent of feed stroke.

A still further object of this invention relates to the provision of a controlled tool feed mechanism for automatically reciprocating the tool to and from the work area within predetermined limits and in synchronous sequential relation to the operation of a work piece positioning mechanism.

Briefly, in accordance with this invention there is provided a compact feed mechanism including a reversible fluid motor having an axially reciprocable piston rod which can be detachably coupled to a tool support. The mechanism includes a fluid control chamber which adjustably controls the rate of piston rod travel to permit a rapid approach and return of the tool to and from a work piece while providing a metered feed of the tool at the work piece. The invention also contemplates the provision of an arrangement for limiting the stroke of the rod and tool assembly and for automatically reversing the feed mechanism and retracting the rod and tool assembly in response to the attainment of the limited position of the tool. There is also provided an arrangement for automatically repeating the work stroke of the feed mechanism between predetermined limits in synchronous sequential relation to the operation of a work piece positioning mechanism. The entire mechanism, including its controls, can be readily mounted for operative performance on any standard tool support.

In the drawings:
FIG. 1 is a plan view of the controlled tool feed mechanism of this invention;
FIG. 2 is a partial sectional view taken along the lines 2—2 in FIG. 1 and diagrammatically showing a solenoid actuated reversing valve in operative relation to the feed mechanism;

FIGS. 3 and 4 illustrate the manner in which the feed mechanism and its controls can be assembled on a standard drill press in cooperative relation to a work piece positioning mechanism;
FIG. 5 is a schematic diagram of an electrical circuit for controlling the operation of the tool feed mechanism alone or in conjunction with a work piece positioning mechanism; and
FIG. 6 is a disassembled plan view of the supporting yoke and quill clamp assembly of this invention.

For exemplary purposes the following more detailed description will relate to the application of the controlled feed mechanism of this invention to a standard type drill press. The details of the control feed mechanism are best shown in FIGS. 1 and 2 of the drawings as including an axially reciprocable piston rod 10 which carries a yoke 11 at one end having a quill clamp 12 adapted to receive and clamp the quill of a rotating drill or the like therein.

In the preferred form shown in the drawings, the piston rod 10 is made up of a plurality of interconnected sections. A power cylinder 15 surrounds the intermediate section 16 of the piston rod and is provided with sealed heads 17 and 18 at each end. A piston 20 is mounted on the rod section 16 for reciprocation within the cylinder 15 in response to the selective application of pneumatic pressure supplied through ports 21 and 22 at each end of the cylinder. Pneumatic pressure is selectively supplied to and exhausted from opposite ends of the cylinder 15 from a solenoid-actuated reversing valve 25. In the preferred form shown in the drawings, the reversing valve 25 has a solenoid-actuated valve spool 26 which controls the supply of pneumatic pressure through a pair of discharge ports 27 and 28 to reciprocate the piston rod 10 in the customary manner.

The section 30 of the piston rod telescopically extends through a tubular sleeve 31 which in turn is surrounded by a control cylinder 32 and slidably extends through a control piston 35 disposed for reciprocation therein. The control cylinder 32 is provided with ports 36 and 37 in each end which are interconnected by a by-pass conduit 38 having a metered passageway 39 whose size is controlled by an adjustable needle valve 40. A hydraulic fluid, such as oil or the like, is supplied to the control cylinder 32 and the control piston 35 is ordinarily reciprocated against the head of hydraulic fluid within the control cylinder; the back pressure of the fluid head in each case being determined by the metered flow of hydraulic fluid through the by-pass passageway 39.

The control piston 35 has an internally splined passage 41 through which the sleeve 31 extends and which normally by-passes the hydraulic fluid therethrough. However, the sleeve 31 has an enlarged portion 42 at one side of the control piston 35 and in axially spaced relation from an abutment in the form of a snap ring 43 which is adapted to engage the other side of the control piston. The axial spacing between the enlargement 42 and the snap ring 43 is greater than the axial dimension of the control piston 35 so that when the sleeve 31 is positioned to the left, when viewed in FIG. 2 of the drawings, the splined passage 41 is opened by the enlargement 42 before the snap ring abutment 43 engages the control piston 35 to move it to the left. The rod section 30 which passes through the sleeve 31 is greater in length than the sleeve and carries at its free extremity a threaded stop nut 45. The axial distance between the adjacent extremity of the sleeve 31 and the stop nut 45 may be adjusted to correspond to the axial approach stroke of the drill between its inactive and active work engaging positions.

In operation, when pneumatic pressure is supplied to the port 21 of the main cylinder 15, the piston rod 10 is positioned axially towards the work piece; the rod section 30 passing freely through the tubular sleeve 31 until the stop nut 45 engages the adjacent extremity of the sleeve. When the stop nut 45 engages the adjacent extremity of the sleeve 31, further movement of the rod 10 in the feed direction causes the sleeve to move in the same direction, whereupon the enlargement 42 closes the splined passage 41 in the control piston 35 and moves the control piston in the same direction against the head of hydraulic fluid at the right end when viewed in FIG. 2 of the drawings. It is readily apparent that the rod 10 will initially have a rapid approach until the tool reaches the work piece, at which point the rate of tool feed is reduced by virtue of the head of hydraulic fluid against which the control piston 35 works as determined by the setting of the needle valve 40 in the by-pass passageway 39. When the pneumatic pressure is reversed in the power cylinder 15 to return the rod and tool assembly from the work piece, the enlargement 42 uncovers the splined passage 41 through the control piston 35 and the snap ring 43 engages and moves the control piston in the return direction. However, since the splined passage 41 is open, the hydraulic fluid within the control cylinder 32 is bypassed through the splined passage and permits a rapid return of the tool and rod assembly from the work piece.

As best shown in FIGS. 3 and 4 of the drawings, the feed mechanism is preferably mounted on the same mounting head 46 which carries the drill 47; the head 46 being supported in turn on a vertical post 48 in the usual manner. The drill shaft 49, which movably extends through the head 46, may be coupled through a suitable pulley and belt connection to a driving motor carried by the head not forming part of this invention and therefore not shown. The main piston rod 10 also movably extends through the head 49 along an axis parallel to but spaced from the axis of the drill shaft 49. The substantially rigid coupling between the rod 10 and the drill quill provides a direct straight line axial feed for the drill within the structural confines of the mounting head, thereby readily permitting a grouping of drill presses, each having a controlled feed, in close proximity about an indexing table.

The substantially rigid coupling is preferably accomplished by means of the assembly including the yoke 11 and quill clamp 12 best shown disassembled in FIG. 6 and assembled on the piston rod 10 in FIGS. 1 and 2 of the drawings. The yoke 11 is a rigid supporting member adapted to be clamped securely on the piston rod 10 and is provided with flat bearing surfaces 13 at the extremity of each arm to support the quill clamp 12. The quill clamp 12 is annular in form to encircle the drill quill and has diametrically opposed key-way slots 14 adapted to slidably receive the yoke arm extremities therein. When assembled, the interconnected yoke 11 and quill clamp 12 provide a substantially rigid coupling which nevertheless has some limited freedom of relative movement between the cooperating bearing surfaces to accommodate minor displacements between the drill shaft 49 and the piston rod 10 and thereby prevent binding.

The various threaded connections between the sections of the piston rod 10 and the stop nut 45 can be adjusted to change the length of stroke and/or feed. Similarly, the size of the by-pass passageway 39 in the control cylinder can be adjusted by the needle valve 40 to control the rate of metered feed after the tool engages the work piece. This arrangement provides a direct fluid-actuated drive for the tool which is under continuous control of either the power piston 20 alone or in combination with the control piston 35 to provide a highly sensitive and accurate tool feed. In the case of a drill press, it eliminates undesirable back-lash which normally results when the tool breaks through the work piece. The mechanism is assembled as a compact unit which has relatively few moving parts, is light in weight, economical in cost, and which can be readily mounted on a standard tool support without major alteration. It also provides an adjustable rapid approach and return to and from the work piece and a metered feed through the work piece for optimum work performance under high production.

Additional control and sensitivity is provided for the feed mechanism by incorporating in the fluid operating system an arrangement for limiting the forward stroke of the tool to a predetermined extent, thereby assuring a high degree of accuracy in the drilling operation. The feed mechanism is shown assembled in a suitable housing and coupled to a drill press head in FIG. 3 of the drawings and also in conjunction with the operative components of the control system and a work positioning mechanism in FIG. 4 of the drawings. The limit control contemplates the actuation of a suitable limit switch 50 by engagement with a cam surface 52 on the rod 10 when the rod reaches the predetermined limiting position, at which time the limit switch 50 is closed to automatically energize the solenoid-actuated reversing valve 25 in a manner to be hereinafter more fully described.

FIG. 5 is a schematic diagram of an electrical control circuit which includes the limit switch 50 and the solenoid coils 53 and 54 for positioning the valve spool 26 in the manner hereinbefore described. This control circuit is contained in the housing A which forms a part of the over-all assembly of the feed mechanism as shown in the drawings. Alternating current electrical energy is supplied from the lines $L_1$ $L_2$ and is converted to direct current by the rectifier R and then fed through a foot switch S to a condenser 55. The foot switch S is normally biased in a position to connect the rectifier output across the condenser 55 so that when the foot switch is depressed, it connects the condenser through a push-button switch 56 to the advance solenoid coil 53 which is energized by the condenser discharge to shift the valve spool 26 in a direction to connect the supply of pneumatic pressure to the advance side of the power cylinder 15. The retract solenoid 54, which positions the valve spool 26 to the opposite side of the valve chamber, is connected in series with the limit switch 50. Thus, when the rod 10 attains its limiting forward position and the cam surface 52 engages and closes the limit switch 50, it energizes the retract solenoid to reverse the valve 25 and return the rod 10 from the work piece. Each of the solenoid circuits includes an additional push button switch 57 and 58 respectively which may be depressed to manually activate the reversing valve 25 independently of the foot switch S.

Another form of control is also shown in FIGS. 4 and 5, wherein a fluid actuated mechanism W is provided for advancing a work piece into or through the work area. The work piece positioning mechanism W utilizes a fluid actuated piston rod 10A similar to the tool feed rod 10 and having a similar reversing valve 25A for controlling its reciprocation. It also includes a pair of limit switches 60 and 61 which are adapted to be coupled into the main control circuit (FIG. 5) to automatically repeat the actuation of the tool piece in predetermined synchronous relation to the actuation of the work piece positioned mechanism. With this arrangement, the foot switch S is replaced by a cam actuated switch which automatically performs essentially the same function as the foot switch in an automatic cycle of operation.

Referring again to FIG. 5 of the drawings in conjunction with FIG. 3, there is shown an additional limit switch 62 located adjacent the retracted position of the tool rod 10 and adapted to be engaged by the cam 52 to cause the condenser 63 to discharge through a push button switch 64 and the advance solenoid coil 65 of the work piece reversing valve 25A to position or advance the work piece into or through the work area. After the work piece piston rod 10A has advanced the work piece into the work area, the cam 66 engages the limit switch 61, which is located adjacent the limiting position of the work piece piston rod, and energizes the retract coil solenoid 67 of the reversing valve 25A to retract the rod 10A from the work area. When the work piece piston rod 10A is fully retracted, it engages the limit switch 60, located adjacent its retracted position, which acts in place of the foot switch S to discharge the condenser 55 through the advance solenoid coil 53 of the tool feed mechanism, thereby supplying pneumatic pressure to the advance side of the tool cylinder 15 and causing the tool feed rod 10 to advance the tool towards the work piece. Thereafter, when the tool feed rod 10 attains the limiting position controlled by the limit switch 50, the cam surface 52 on the rod 10 engages the limit switch 50 to energize the retract solenoid coil 54 and reverses the supply of pneumatic pressure to the power cylinder 15 to retract the tool feed rod 10 in a manner hereinbefore described. Upon retraction of the tool feed rod 10, the cam 52 again engages and closes the limit switch 62 to activate the work piece positioning mechanism W and advances the work piece into the work area preparatory to another drilling operation; this operation being sequentially repeated in a predetermined synchronized cycle determined by the location and disposition of the limit switches and cam surfaces in relation to the tool feed and work piece positioning mechanisms.

The compact nature and construction of the controlled tool feed mechanism permits it to be readily mounted on standard drill presses or the like for grouping about an indexing table to perform successive work operations on a work piece presented by the indexing table. The automatic control arrangement hereinbefore described also permits automatic synchronization of the tool feed with the work feed as represented by the rotation of the indexing table and in a manner not possible with conventional arrangements heretofore known.

I have shown and described what I consider to be the preferred embodiments of my invention along with modified forms and suggestions, and it will be obvious to those skilled in the art that other changes and modifications may be made without departing from the scope of my invention as defined by the appended claims.

I claim:

1. A controlled tool feed mechanism comprising in combination, a power cylinder having a piston operably disposed for reciprocation therein, a piston rod carried by said power piston, one end of said rod being adapted for coupling to a tool, valve means for selectively supplying pneumatic pressure to opposite sides of said power piston, a fluid filled control cylinder arranged in tandem with said power cylinder and having a control piston operably disposed for reciprocation therein, a tubular control member for reciprocating the control piston, said control piston having a central axially extending passageway therethrough receiving therein in relative axially movable relation said tubular control member, said control member having fixed abutments spaced axially on opposite sides of said control piston and adapted to engage said control piston for axial movement in either direction, the axial spacing between said abutments being greater than the axial dimension of said control piston to provide for said relative axial movement, the other end of said piston rod extending through said control member in relative axially movable relation therewith and extending beyond the extremity thereof, a lost-motion connection coacting between said other end of said piston rod and the corresponding end of said control member to permit independent axial travel of the main piston rod for a predetermined approach distance towards the work piece and combined travel thereafter in the same direction, one of said abutments forming a closure for said control piston passageway operative to prevent by-passing of hydraulic fluid therethrough during combined travel of said main piston rod and said control member in the approach direction, and adjustable by-pass means selectively coacting between opposite sides of said control piston during said combined travel to limit the rate of travel.

2. A controlled tool feed mechanism comprising in combination, a fluid actuated power cylinder having a piston operably disposed for reciprocation therein, a reversing valve coacting therewith to selectively supply pneumatic pressure to opposite sides of said power piston, a control cylinder mounted in tandem with said power cylinder and having a control piston operably disposed for reciprocation within a hydraulic fluid contained therein, a by-pass passageway independently interconnecting opposite ends of the control cylinder, said control piston having a central aperture therethrough, a tubular control rod slidably extending through the control cylinder and the control piston aperture and having a diameter less than the diameter of the aperture, a main piston rod carried by said power piston and having tool coupling means on one end with the other end slidably passing through said tubular control rod and extending beyond the extremity thereof, stop means carried by the extremity of said main piston rod and adapted after a predetermined axial travel in the forward direction to engage the adjacent extremity of the tubular control rod for combined movement of the main piston rod and control rod in the forward direction, said control rod having abutments spaced axially on opposite sides of the control piston respectively and adapted to engage said control piston for axial movement in either direction, the axial spacing between the abutments being greater than the axial dimension of the control piston, and the abutment on the side adjacent said stop means forming a closure for the control piston aperture to prevent by-passing hydraulic fluid therethrough during combined travel of the main piston rod and control rod in the forward direction.

3. The controlled feed mechanism of claim 2 wherein said by-pass passageway independently interconnecting opposite ends of the control cylinder includes valve means for adjusting the size of the opening and varying the flow of fluid therethrough, and wherein said stop means is adjustably mounted at the extremity of the main piston rod to vary the distance the main piston rod will travel in the forward direction independently of the control rod.

4. A device for coupling together a reciprocable tool shaft and a reciprocable feed rod in spaced parallel relation comprising in combination, a yoke having a pair of arms extending from a common juncture, said juncture having clamp means for releasably receiving the feed rod therethrough with the yoke arms extending transversely to the rod axis and towards the tool shaft, an annular clamping member for releasably receiving the tool shaft therethrough, said clamping member having outwardly facing slots in diametrically opposed edges thereof, and the extremity of each yoke arm being formed to slidably engage said clamping member slots respectively, the bearing surfaces therebetween coacting to prevent binding action during reciprocation of the tool shaft by the feed rod.

5. In a tool support having a head supporting a rotary tool shaft for vertical reciprocation towards a work piece, said tool shaft carrying a non-rotatable sleeve adjacent its lower extremity, a feed mechanism having a reciprocal piston rod, said mechanism being mounted on said head in spaced relation from said tool shaft and having its piston rod extending through said head for reciprocation along an axis parallel to said tool shaft, and means for releasably coupling said tool shaft for unitary reciprocation with said piston rod towards and away from the work piece, said means including a yoke carried by said piston rod and having parallel yoke arms extending transverse to the axis of reciprocation towards said sleeve, an annular clamping member clamped about said sleeve, and interlocking bearing surfaces coacting between said yoke arms and said clamping member to secure them together in non-binding relation.

6. In combination, a reciprocable fluid actuated tool feed mechanism comprising a power cylinder having a piston operatively disposed for reciprocation therein, a main tool positioning piston rod carried by said power piston, a fluid filled control cylinder arranged in tandem with said power cylinder and having a control piston operatively disposed for reciprocation therein, a control rod for reciprocating said control piston, a lost motion connection coacting between said main piston rod and said control rod to permit independent axial travel of said main piston rod for a predetermined approach distance towards a work piece and combined travel thereafter in the same direction, by-pass means selectively coacting between opposite sides of said control piston during said combined travel to limit the rate of travel, a solenoid actuated reversing valve for selectively supplying pneumatic pressure to opposite sides of said power piston, and a control circuit for said reversing valve, said control circuit comprising a forward and a retract solenoid coil an impedance connected in said control circuit to store a charge of electrical energy, switch means coacting in one position to connect said impedance across a source of electrical energy for charging and in another position for discharging through said forward solenoid coil, thereby to move said main piston rod in said approach direction, limit switch means positioned adjacent said main piston rod for independently connecting said retract solenoid coil across the source of electrical energy, and cam means positioned on said main piston rod for coaction at the end of its forward stroke with said limit switch means to energize the retract solenoid coil and automatically retract said main piston rod away from the work piece.

References Cited in the file of this patent

UNITED STATES PATENTS

| | | |
|---|---|---|
| 897,676 | Thompson | Sept. 1, 1908 |
| 1,582,468 | Heald et al. | Apr. 27, 1926 |
| 2,209,608 | Nye et al. | July 30, 1940 |
| 2,259,636 | Harrington | Oct. 21, 1941 |
| 2,307,544 | Robinson | Jan. 5, 1943 |
| 2,358,361 | Svenson | Sept. 19, 1944 |
| 2,430,019 | Jenkins | Nov. 4, 1947 |
| 2,676,572 | Perry et al. | Apr. 27, 1954 |
| 2,781,026 | Schlatter et al. | Feb. 12, 1957 |